(No Model.)
W. C. ANDERSON.
BRUSH RAKE.
No. 559,882. Patented May 12, 1896.
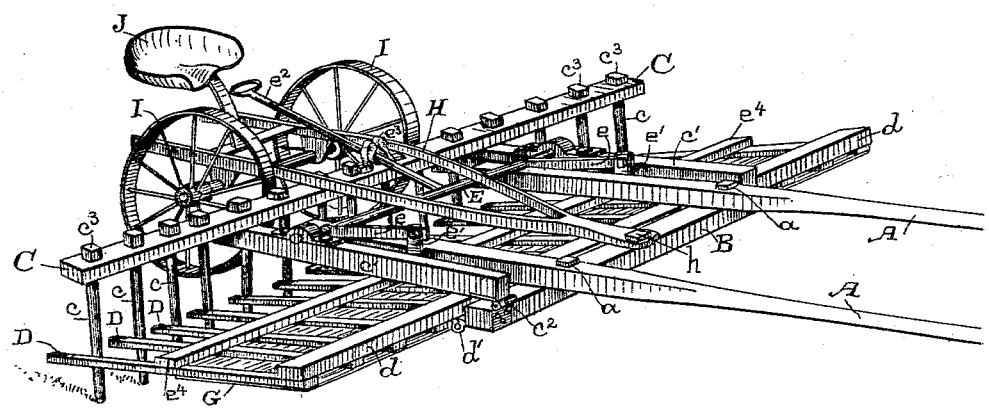
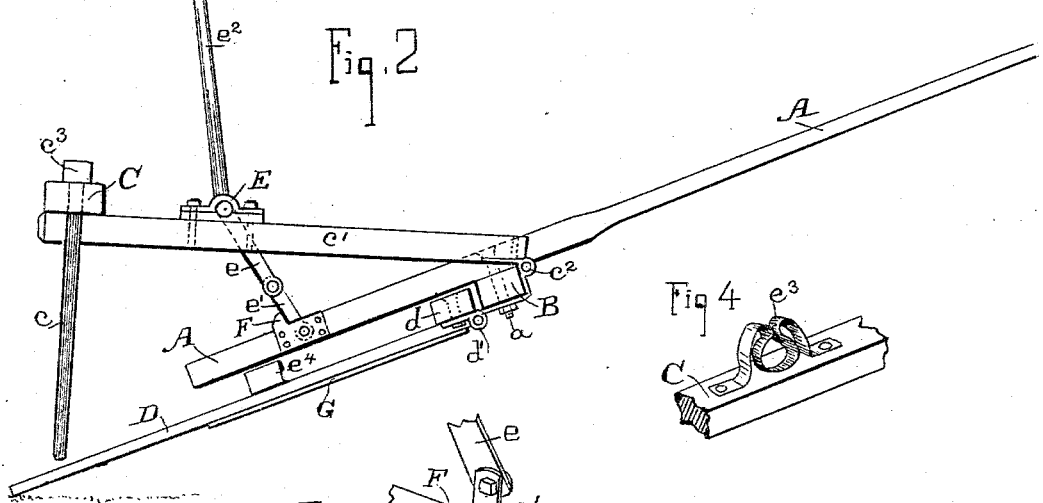
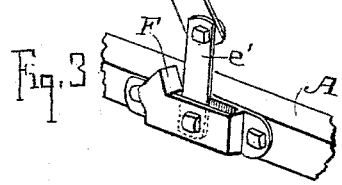
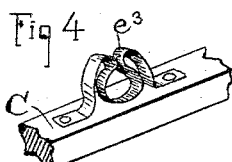

UNITED STATES PATENT OFFICE.

WILLIAM C. ANDERSON, OF SAN JOSÉ, CALIFORNIA.

BRUSH-RAKE.

SPECIFICATION forming part of Letters Patent No. 559,882, dated May 12, 1896.

Application filed August 26, 1895. Serial No. 560,594. (No model.)

*To all whom it may concern:*

Be it known that I, WILLIAM C. ANDERSON, a citizen of the United States, residing at San José, Santa Clara county, State of California, have invented an Improvement in Brush-Rakes; and I hereby declare the following to be a full, clear, and exact description of the same.

My invention relates to that class of brush-rakes in which an approximately vertical rake operates in conjunction with an inclined or slanting guard or shield; and it consists in the novel construction, arrangement, and combination of parts, which I shall hereinafter fully describe and claim.

The object of my invention is to provide a simple and effective brush-rake adapted to be easily operated to place it in position for collecting the brush or to relieve itself from said brush in the act of dumping.

Referring to the accompanying drawings, Figure 1 is a perspective view of my brush-rake, showing it in a working position. Fig. 2 is a side view showing it in the act of dumping. Fig. 3 is a detail of the lock for the links $e'$. Fig. 4 is a view of the lever-controlling spring $e^3$.

A are shafts to which, at $a$, is bolted rigidly a cross-bar B.

C is a rake-head having teeth $c$ and forwardly-extending arms $c'$, which are hinged at $c^2$ to the projecting ends of the cross-bar B.

D is the inclined guard or shield, the slats or bars of which extend backwardly between the teeth $c$ of the rake-head, and said bars are attached at their forward ends to the head $d$, which is hinged at $d'$ to the cross-bar B. Mounted in suitable bearings upon the arms $c'$ of the rake is a rock-shaft E, having end cranks $e$, connected by links $e'$ with the shafts A. A lever $e^2$ is attached to the rock-shaft and is adapted to operate it, said lever being held in a depressed position by means of a spring-clasp $e^3$ on the head C of the rake.

The operation of the device is as follows: When the lever $e^2$ is pressed backwardly to its lowest position, it so rocks the shaft E that through its crank connection with the shafts A said shafts will be held in a raised position, with the rake-teeth $c$ in an approximately vertical position on the ground. The guard or shield, being entirely free, will be raised up by the brush to a slight inclination, and as the implement moves over the ground the brush will be collected by the rake-teeth and will be held down and pressed under the guard, which freely rises and lies upon the top of the brush-heap. When a sufficient amount is collected, the lever $e^2$ is thrown upwardly, so that through its crank connection with the shafts A the rear ends of the latter will be forced down, which will have the effect of raising the rake about the hinge connection $c^2$ of its arms, and will also have the effect of throwing down the guard or shield to a greater angle by reason of the rear ends of the shafts pressing down upon said shield. The parts being thus held, the shield down and the rake up, the implement will simply rise over the pile of brush and leave it behind. In this movement the cranks of the rock-shaft and the connecting-links are thrown into line and are there locked by coming in contact with lugs F, secured to the shafts, and in which said links work. Being thus locked in line and rigidly held, the parts are kept in a position for dumping as long as necessary, and upon being relieved will return to their nornal position. The ends of the shafts come in contact with a cross-bar $e^4$ on the guard or shield and thereby press it downwardly. In order to keep the brush from getting tangled between the front portion of the guard or shield, I cover said portion with a light piece of sheet-iron G. The teeth $c$ of the rake are prevented from dropping through the head C by having enlarged heads $c^3$. In some cases, where the rake is a large and heavy one, I attach a frame H by means of a king-bolt $h$ to the cross-bar B. This frame is mounted upon wheels I and carries a seat J, the position of which can be properly determined, to relieve, by the weight of the rider, the weight of the rake as much as possible.

Having thus described my invention, what I claim as new, and desire to secure by Letters Patent, is—

1. A brush-rake consisting of shafts having a fixed cross-bar, a rake having arms hinged to said cross-bar, an inclined guard or shield having bars playing between the rake-teeth and a head hinged to said cross-bar, and means for depressing or raising the rear ends of the shafts.

2. A brush-rake consisting of shafts having a fixed cross-bar, a rake having arms hinged to said cross-bar, an inclined guard or shield having bars playing between the rake-teeth and a head hinged to said cross-bar, and means for depressing or raising the rear ends of the shafts, consisting of a rock-shaft on the rake-arms and having a crank-and-link connection with said shafts, and a lever for operating said rock-shaft.

3. A brush-rake consisting of shafts having a fixed cross-bar, a rake having arms hinged to said cross-bar, an inclined guard or shield, the bars of which work between the teeth of the rake, said guard or shield having a head which is hinged to the cross-bar of the shafts, a rock-shaft mounted upon the arms of the rake and having a lever for operating it, crank-arms of the rock-shaft and links connecting said crank-arms with the shafts and lugs on the shafts for locking the links and cranks in line.

4. A brush-rake consisting of shafts having a fixed cross-bar, a rake having arms hinged to said cross-bar, an inclined guard or shield, the bars of which work between the teeth of the rake, said guard or shield having a head which is hinged to the cross-bar of the shafts, a rock-shaft mounted upon the arms of the rake and having a lever for operating it, crank-arms of the rock-shaft and links connecting said crank-arms with the shafts, and a cross-bar on the guard or shield with which the ends of the shafts come in contact to force it down.

5. A brush-rake consisting of shafts having a fixed cross-bar, a rake having arms hinged to said cross-bar, an inclined guard or shield, the bars of which work between the teeth of the rake, said guard or shield having a head which is hinged to the cross-bar of the shafts, a rock-shaft mounted upon the arms of the rake and having a lever for operating it, crank-arms of the rock-shaft and links connecting said crank-arms with the shafts, a cross-bar on the guard or shield with which the ends of the shafts come in contact to force it down and a protecting-plate under the upper portion of the guard or shield.

6. A brush-rake consisting of shafts having a fixed cross-bar, a rake having arms hinged to said cross-bar, an inclined guard or shield, the bars of which play between the teeth of the rake, said guard or shield having a head hinged to the cross-bar, a rock-shaft on the arms of the rake having a lever for operating it and a crank-and-link connection with the shafts whereby they are raised and depressed, and a wheeled frame attached to the cross-bar of the shafts and provided with a seat for relieving the weight of the front portion of the implement.

In witness whereof I have hereunto set my hand.

WILLIAM C. ANDERSON.

Witnesses:
WILL S. CLAYTON,
WESLEY PIEPER.